United States Patent [19]

House

[11] Patent Number: 4,740,998
[45] Date of Patent: Apr. 26, 1988

[54] CLOCK RECOVERY CIRCUIT AND METHOD

[75] Inventor: David C. House, Worcester, Mass.

[73] Assignee: Data General Corporation, Westboro, Mass.

[21] Appl. No.: 248,752

[22] Filed: Mar. 30, 1981

[51] Int. Cl.[4] .............................................. H04L 7/02
[52] U.S. Cl. .................................. 375/110; 328/155; 375/118
[58] Field of Search ............... 307/511, 518, 527, 528; 328/109, 133, 155; 331/1 A, 76; 360/51, 41; 370/100; 375/110, 118, 119

[56] References Cited

U.S. PATENT DOCUMENTS

| | | | |
|---|---|---|---|
| 3,290,611 | 12/1966 | Horlacher et al. | 331/1 A |
| 3,537,013 | 10/1970 | Feldman | 331/1 A |
| 3,668,315 | 6/1972 | Heitzman | 375/119 |
| 3,745,248 | 7/1973 | Gibson | 375/110 |
| 3,819,853 | 6/1974 | Stein | 375/118 |
| 4,208,724 | 6/1980 | Rattlingourd | 375/118 |
| 4,227,251 | 10/1980 | Kazama et al. | 375/110 |
| 4,309,662 | 1/1982 | Baudoux | 331/1 A |

Primary Examiner—Benedict V. Safourek
Attorney, Agent, or Firm—Robert L. Dulaney

[57] ABSTRACT

A circuit and method for digital recovery of a data clock from an NRZI coded data bit stream. A source clock pulse having a frequency which is an integer multiple of the data bit rate is used to clock a counter. An output of the counter is used as the source of the data clock. The counter is reset at each transition in the NRZI data stream, thereby resynchronizing the data clock with the data stream.

1 Claim, 3 Drawing Sheets

CLOCK RECOVERY CIRCUIT AND METHOD

BACKGROUND OF THE INVENTION

1. Field of the Invention

The invention relates generally to circuits for synchronization of received data and more particularly to a circuit for recovering a data clock pulse from an NRZI coded data stream.

2. Description of the Prior Art

Synchronous transmission of data, i.e. data which is synchronous with a timing signal, is commonly coded in NRZI (non-return to zero inverted) form. In this form, a zero, or low, data state is indicated by a transition in the data stream from low to high or high to low. A one, or high, data state is indicated by the absence of a transition in the data stream. In cases of data transmission using a modem where the data clock is derived or "recovered" from the received data, NRZI coding is typically used to insure that an adequate number of data stream transitions occur for accurate generation of the timing signal.

In addition, "protocols" or generalized techniques of formating and structuring the data to be transmitted have been developed. Two common protocols are Synchronous Data Link Control and the High-level Data Link Control. These techniques vary in some respects, but have many features in common. One of these features is termed "zero insertion", which ensures that, except for specifically designated control characters, no more than five consecutive high signals will be received before a low signal will be seen. In other words, a data stream transition will appear after no more than six bit times.

Synchronous modems typically provide both a transmit clock for use in performing the NRZI encoding and a receive clock for use in decoding the received data. Some modems, however, provide only a transmit clock and lower cost asynchronous modems generally provide neither. Timing for the received data stream in the absence of a receive clock is generally accomplished through use of an analog phase-locked loop. This technique typically compares the transitions in the received data with a source frequency. If they are not coincident, an error voltage is generated which raises or lowers the source frequency, within limits, until the clock is coincident with the data stream transistions.

The phase-locked loop technique has certain disadvantages. For example, individual source frequencies must be generated by discrete components having varying tolerances. Costly components must generally be used to obtain a precise source frequency. In addition, if multiple data frequencies must be supported, separate circuits must typically be used to determine each frequency.

The present invention relates to a novel circuit for recovery of a data clock from an NRZI coded data stream which is free of the above mentioned problems.

SUMMARY OF THE INVENTION

The present invention relates to apparatus and method for recovering a data clock signal from a received NRZI coded data stream. A circuit for implementing the invention includes a source clock signal, apparatus for detecting a data stream state transition, apparatus for generating a data clock signal, and apparatus for resetting the data clock generation apparatus when a data stream transition is detected.

It is a feature of the present invention that the source clock has a frequency which is an integer multiple of the data rate.

It is a further feature of the invention that the apparatus for generating the data clock signal is a counter clocked by the source clock signal.

It is an advantage of the invention that it can be constructed using small- and medium-scale integration TTL circuits.

It is another advantage of the invention that multiple data rates can be accommodated.

It is yet another advantage of the invention that multiple synchronization resolution requirements can be accommodated.

Other features and advantages of the present invention will be understood by those of ordinary skill in the art after referring to the detailed description of a preferred embodiment and drawings herein.

DESCRIPTION OF THE PREFERRED EMBODIMENT

Figure 1:
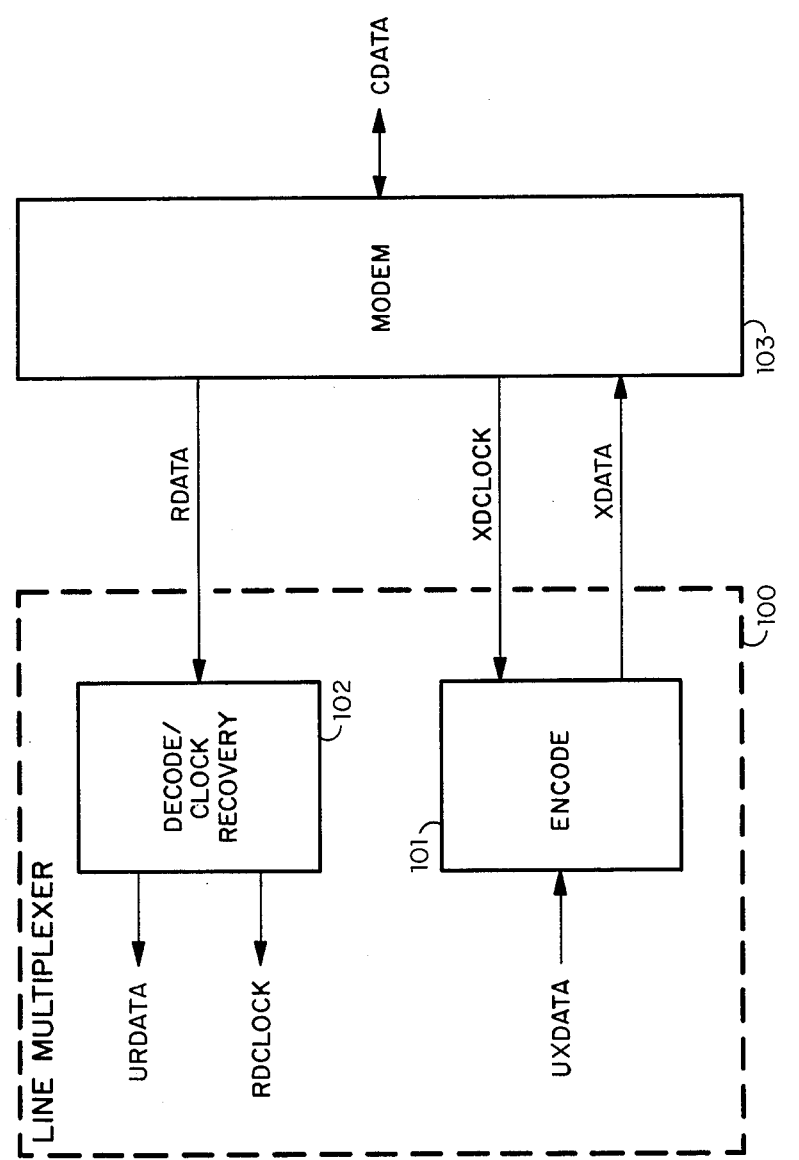
FIG. 1 is a block diagram showing an overview of the present invention.

Referring to FIG. 1, a block diagram of the present invention is shown. Line Multiplexer 100 could be utilized in various ways, for example, it might occupy an input/output slot in a host computer (not shown) or might be resident in a communications chassis which is, in turn, connected to a host computer. Line Multiplexer 100 includes, among other features, Encode Logic 101 and Decode/Clock Recovery Logic 102. Encode Logic 101 receives UXDATA (uncoded data to be transmitted) from the host computer or a processor in Line Multiplexer 100 and XDCLOCK (transmit clock signal) from Modem 103. If Line Multiplexer 100 can produce coded XDATA with its own internal clock, XDCLOCK from Modem 103 can be eliminated, thereby allowing use of a lower cost asynchronous modem. Encode Logic 101 supplies XDATA (NRZI coded data) to Modem 103.

Decode/Clock Recovery Logic 102 receives RDATA (NRZI coded received data) from Modem 103 and supplies URDATA (uncoded received data) and RDCLOCK (recovered data clock signal) to the Line Multiplexer 100 processor or the host computer.

Modem 103 either modulates the XDATA bit stream to generate CDATA (communication line compatible data) for transmission or receives a CDATA bit stream and demodulates it to generate the RDATA bit stream.

Figure 2:
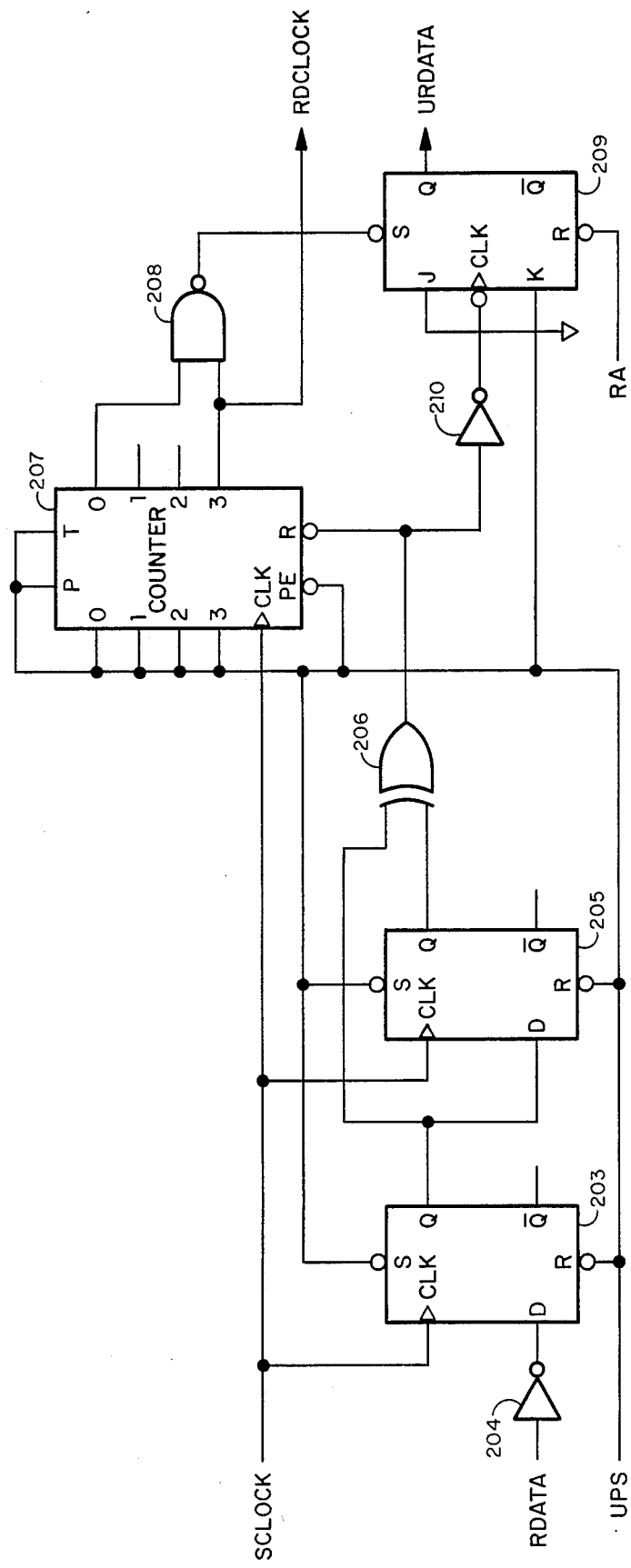
FIG. 2 is a schematic diagram of an NRZI decoding and data clock recovery circuit included within FIG. 1.

Referring now to FIG. 2, a schematic diagram of a preferred embodiment of Decode/Clock Recovery Logic 102 is shown.

SCLOCK is a source clock signal selected to have a frequency which is an integer multiple of the data frequency. In the preferred embodiment discussed below, the source frequency has been chosen to be 16 times the data frequency. That is, 16 SCLOCK pulses will occur for each data bit time. SCLOCK is supplied as the clocking input to flip flops 203 and 205 and to counter 207. Pull up voltage UPS, maintained high, is provided to the S and R inputs of flip flops 203 and 205, the K input of flip flop 209, and the P, T, PE, 0, 1, 2, and 3 inputs of Counter 207.

RDATA is inverted by invertor 204 and supplied to the D input of flip flop 203. The Q output of flip flop 203 is connected as the D input of flip flop 204 and as one of the inputs to X-OR gate 206. The Q output of flip flop 205 is also connected as an input of X-OR gate 206. The output of gate 206 is supplied to the reset input of counter 207 and, after inversion by inverter 210, to the clocking input of flip flop 209.

The 0 and 3 outputs of counter 207 are provided as inputs to NAND gate 208, the output of which is connected to the S input of flip flop 209. The 3 output of counter 207 is the source of the RDCLOCK signal. The R input of flip flop 209 is connected to the RA signal from the receiver hardware indicating receiver active status. The J input of flip flop 209 is held low. The Q output of flip flop 209 is the source of URDATA.

SCLOCK, as mentioned above, has been selected in this embodiment to be 16 times the data rate (i.e. N=16). The selection of the SCLOCK frequency depends on such variables as data rate and bit distortion. An SCLOCK to RDCLOCK ratio of 32 to 1 (N=32) might be required at higher data rates, while a ratio of 8 to 1 (N=8) or less could be acceptable at slower data rates. While the ratio of frequencies need not be a power of two, such ratios are normally convenient to work with and lend themselves to making several SCLOCK rates available to the user by repetitive division of a master clock signal source. For whatever SCLOCK-to-data rate multiple is used in a particular application, the outputs of the one or more SCLOCK pulse counters must be connected such that the RDCLOCK pulse occurs N/2 SCLOCK pulses after data transition (sustantially equal to ½ of a bit time) and every N SCLOCK pulses thereafter until the one or more counters are reset by another data transition. This RDCLOCK signal generation timing ensures data sampling will occur substantially at the center of the data bit. Because of the possibility of bit distortion, sampling at or very near the center of a data bit may be critical to avoid erroneous data readings.

Figure 3:
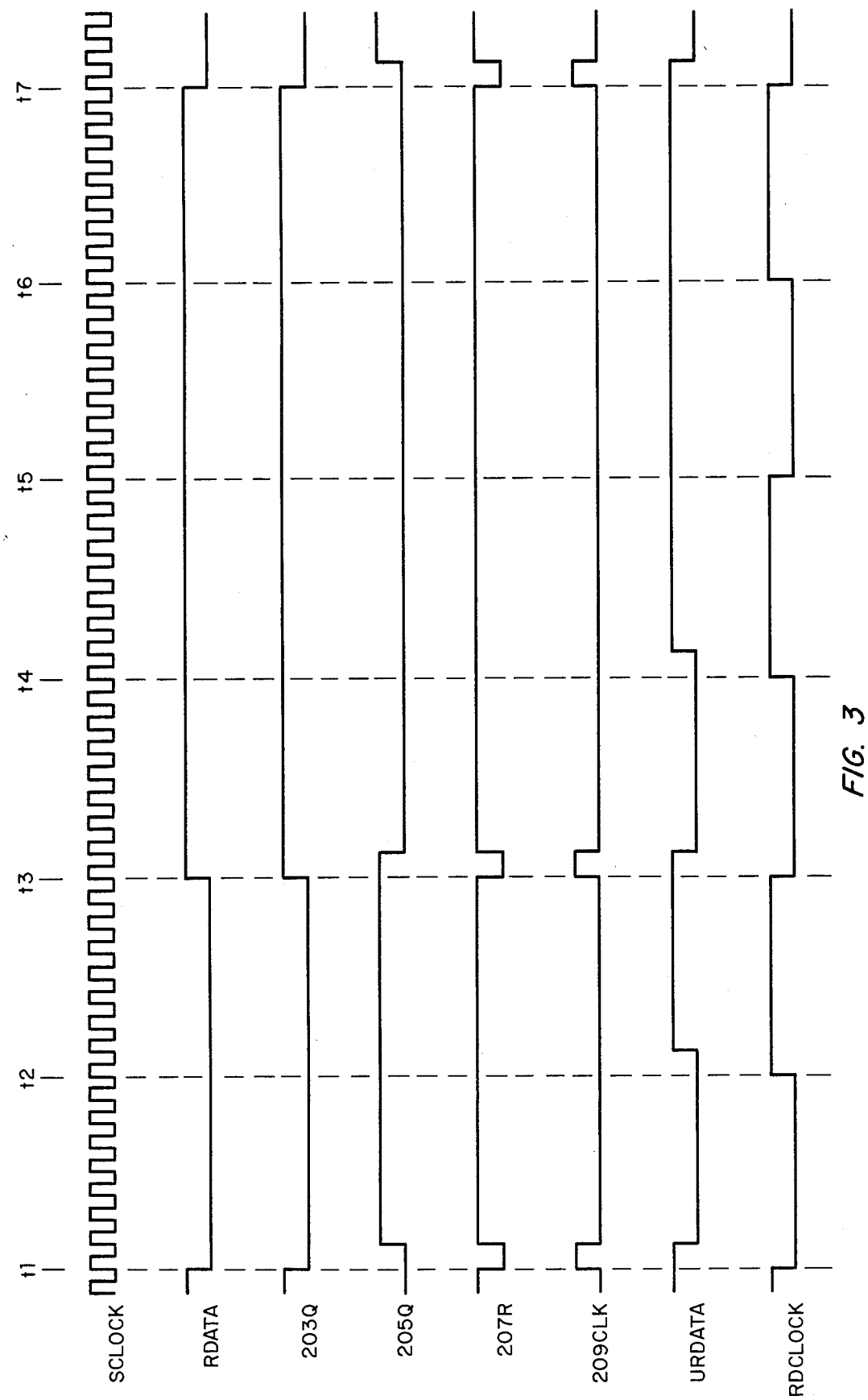
FIG. 3 is an NRZI data decoding and data clock recovery timing diagram.

Referring to FIG. 3, a sample timing diagram for operation of Decode/Clock Recovery Logic 102 is shown. For illustration, FIG. 3 shows an NRZI coded 0010 RDATA bit stream.

Prior to time t1, RDATA is high. Therefore 203Q is high, 205Q is low, and the output of X-OR gate 206 is high. A low bit is being transmitted, therefore a data transition will occur. At the first SCLOCK rising edge (time t1) after the change in RDATA state, 203Q is driven low. Since 205 Q will not go high until the following SCLOCK pulse, both inputs to gate 206 are now low. This causes the output of gate 206 to go low, which resets up counter 207.

At the next SCLOCK pulse after time t1, 205Q is driven high. This changes the output of gate 206 to high and, because of inverter 210, presents a falling edge clocking pulse to flip flop 209. Clocking of flip flop 209 forces URDATA low.

At time t2 (i.e. the eighth SCLOCK pulse after time t1) the 3 output of counter 207 goes high. This output is the source of data clock signal RDCLOCK. As discussed above, it can be seen that counter 207 generates RDCLOCK at substantially one-half of a data bit time after the received NRZI data transition has been detected. The RDCLOCK rising edge will be used as the clock pulse for sampling of the URDATA bit stream. To ensure it has been properly read, URDATA is held for one SCLOCK pulse time after generation of RDCLOCK. At the next SCLOCK pulse (i.e. the ninth pulse after time t1), both inputs to NAND gate 208 will be high. This presents a low signal to the S input of flip flop 209. If 209Q (i.e. URDATA) is not already high, the low signal at 209 S will force it high in preparation for the next data bit.

Another low bit is now being transmitted. Since the previous low bit was indicated by a transition from high to low, the next low bit will be indicated by a transition from low to high. At the next SCLOCK pulse after the data state transition (time t3), 203Q is driven high. Both inputs to X-OR gate 206 are now high, therefore the output of 206 goes low. This again resets counter 207. It can be seen that counter 207 is being reset at each data stream transition (ie. low data bit), therefore, RDCLOCK is being frequently resynchronized with the incoming data.

At the first SCLOCK pulse after time t3, 205Q is driven low, causing the output of gate 206 to go high and presenting a falling edge clocking pulse to flip flop 209. This forces 209Q to a low state.

At time t4, the 3 output of Counter 207 (i.e. RDCLOCK) again goes high. At the next SCLOCK pulse after t4 the inputs to gate 208 are again satisfied and 209Q is driven high. Since the following bit received is high, no transition is detected in the data stream at time t5. RDCLOCK goes low at time t5, but does so because it has filled up and restarted, not because it has been reset by a data transition. The greater the number of consecutive high data bits received, the more the RDCLOCK derived from Counter 207 will begin to diverge from actual received data timing. However, as stated earlier, typical protocols require that no more than five consecutive high data bits be transmitted. RDCLOCK is, therefore, ensured of being resynchronized with the data after no more than six data bit times of "free running". In the example shown in FIG. 3, Counter 207 is reset at time t3 and is not reset again until time t7. This is because a high bit was received between the two low bits.

The advantages and benefits of the invention can now be clearly understood. The invention provides a digitally recovered data clock signal for use in reading the uncoded received data stream. This technique is significantly less expensive than a comparable phase lock loop circuit, since the more expensive discrete components and phase lock loop chips are not required. In addition, SCLOCK can be jumperable to several different frequencies to allow the circuit to accommodate different data rates.

The invention may be embodied in yet other specific forms without departing from the spirit or essential characteristics thereof. For example, the synchronization resolution can be increased by increasing the source frequency to 32 times the data bit rate and ganging two up counters.

The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

I claim:

1. A method of recovering a data clock from an NRZI coded data bit stream using a source clock having a pulse generation rate which is an integer multiple, N, of the data bit time, said method comprising the steps of:

(a) monitoring for a data state transition in the coded data stream;

(b) if a data state transition is not detected, incrementing a counter;

(c) if a data state transition is detected, resetting the counter;

(d) generating a data clock pulse if the counter has reached the appropriate count, said data clock pulse being generated N/2 clock pulses after a data transition is detected and every N source clock pulses thereafter, until the counter is reset by another data state transition; and (e) repeating steps (a)-(d) at each pulse of the source clock.

* * * * *